United States Patent [19]
Sutton

[11] 4,186,812
[45] Feb. 5, 1980

[54] EQUALIZER BAR SUPPORT ASSEMBLY

[75] Inventor: Robert A. Sutton, Davenport, Iowa

[73] Assignee: Caterpillar Tractor Co., Peoria, Ill.

[21] Appl. No.: 813,725

[22] Filed: Jul. 7, 1977

[51] Int. Cl.² .............................................. B62D 55/14
[52] U.S. Cl. ....................................... 180/9.5; 180/9.6
[58] Field of Search ..................... 180/9.5, 9.6, 9.54, 180/9, 9.2 R

[56] References Cited

U.S. PATENT DOCUMENTS

| | | | |
|---|---|---|---|
| 2,778,131 | 1/1957 | Herr | 180/9.6 |
| 2,978,050 | 4/1961 | Risk | 180/9.5 |
| 3,735,830 | 5/1973 | Talley | 180/9.5 |
| 3,910,367 | 10/1975 | Drone | 180/9.5 |

Primary Examiner—Philip Goodman
Attorney, Agent, or Firm—Phillips, Moore, Weissenberger, Lempio & Majestic

[57] ABSTRACT

A support assembly, for an equalizer bar, integrally welded to a main frame of a track-type front loader vehicle. The assembly includes a first central U-shaped plate having a base and first and second legs extending forwardly from the base, a second L-shaped plate having a third leg welded to one side of the base and a fourth leg extending forwardly from the third leg, a third L-shaped plate having a fifth leg welded to the other side of the base and a sixth leg extending forwardly from the fifth leg, a fourth plate welded to the front of the first, the second, the fourth and the sixth legs, a fifth L-shaped plate having a seventh leg welded to the top of the first, the second, the third and the fourth plates, and an eighth leg extending downwardly from the seventh leg and spaced from the base, and a pivot pin coupled to the first, fourth and fifth plates through bosses for holding the equalizer bar in the space between the eighth leg and the base.

15 Claims, 6 Drawing Figures

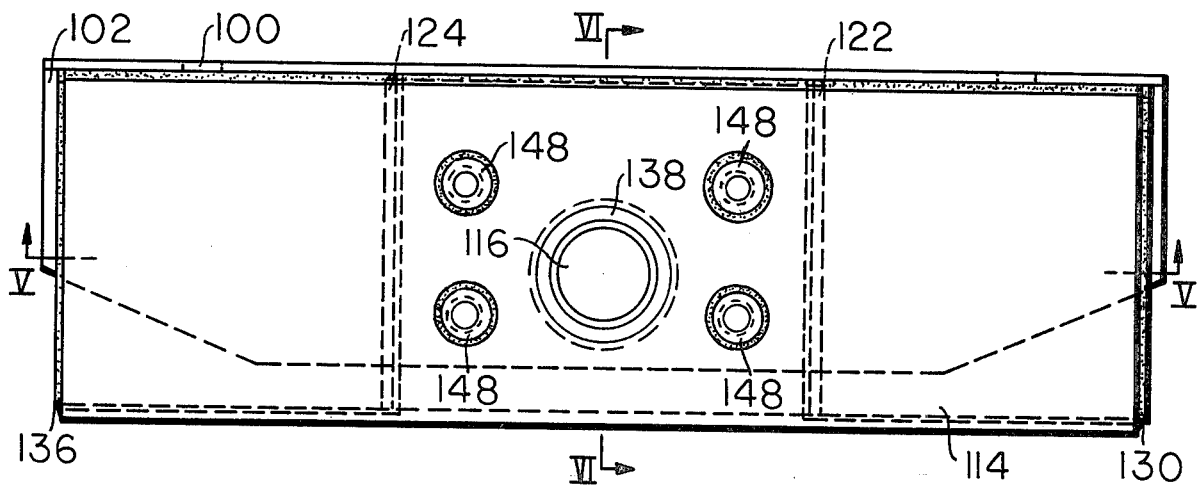
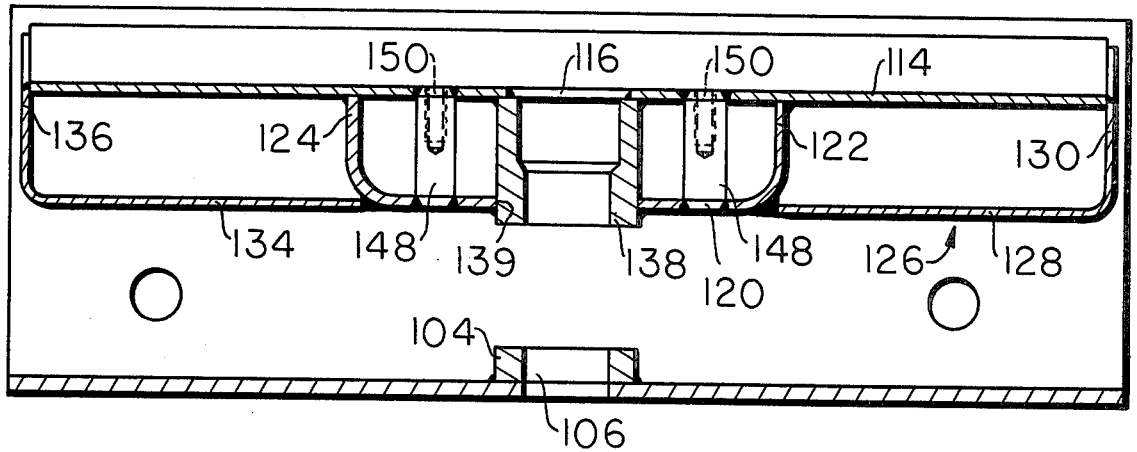
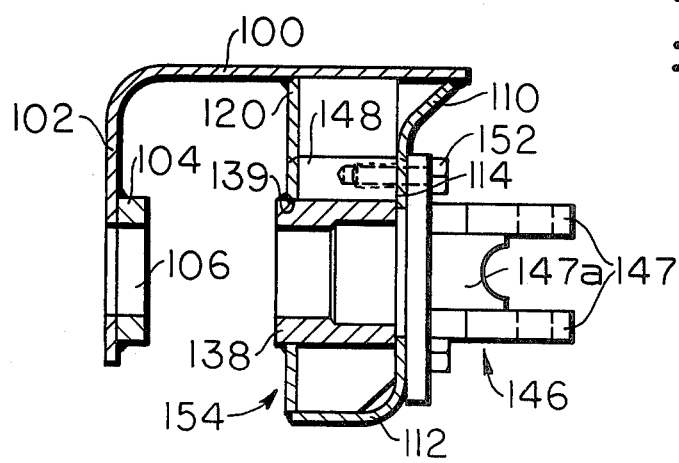

4,186,812

EQUALIZER BAR SUPPORT ASSEMBLY

BACKGROUND OF THE INVENTION

This invention relates to a frame member for an earthmoving vehicle and, more particularly, to a support assembly for an equalizer bar used in a track-type loader.

Conventional track-type loaders comprise a main frame and a pair of endless track assemblies, each mounted on a track roller frame. Each track roller frame is normally mounted on the main frame by a shaft to permit the track roller frames to oscillate thereabout during vehicle operation. Substantial side loads on the forward ends of the track roller frames tend to move these frames out of lateral alignment during operation, thereby producing undesirable stress on, for example, support bearings for the shaft. Consequently, equalizer bars are used to alleviate the problem by pulling the forward ends of the track roller frames inwardly towards each other.

An equalizer bar typically is pivotally supported on a main frame which carries various loads. For example, attachments are added to the main frame to secure cables or other equipment for pulling or towing by the loader vehicle. Additionally, lift arms and lift cylinders are mounted on the main frame to lift implements such as a loader bucket. As can be appreciated, these implements produce a variety of substantial loads, such as shear loads and front loads, which are carried by the main frame and may adversely affect the equalizer bar and its support on the main frame.

It can therefore be appreciated that the support for an equalizer bar may have to be designed to carry substantial loads. One approach to increasing the strength of the equalizer bar support to prevent premature failure is to increase the size and weight of the support components. However, this is not particularly satisfactory since the increased size and weight of each component undesirably adds to the cost of manufacturing and operating the vehicle.

SUMMARY OF THE INVENTION

The present invention is directed to overcoming one or more of the problems as set forth above.

According to the present invention, there is provided a support assembly for an equalizer bar for a loader having a main frame, comprisng a box section formed of a plurality of plates, means, including one of said plates, for integrally connecting said box section to the main frame, said connecting means and said box section having means defining a space therebetween, and means for pivotally holding the equalizer bar in said space.

BRIEF DESCRIPTION OF THE DRAWINGS

FIG. 4 is a front elevational view of FIG. 3 without the clevis.

FIG. 5 is a section taken along lines V—V of FIG. 4.

FIG. 6 is a section taken along lines VI—VI of FIG. 4.

DETAILED DESCRIPTION OF THE DRAWINGS

Figure 1:
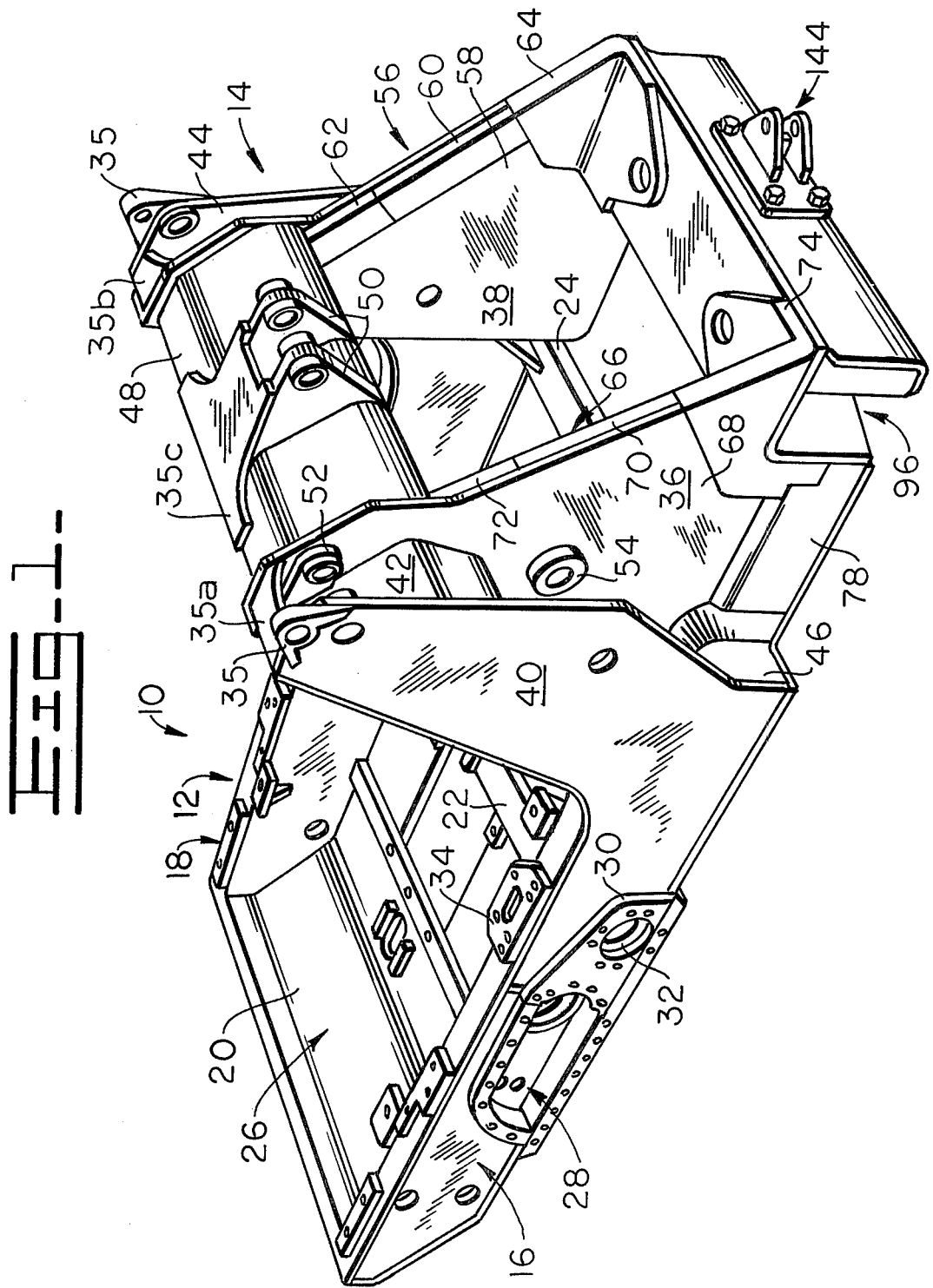
FIG. 1 is a three dimensional view of a main frame for an earthmoving vehicle.

With reference to FIG. 1, there is shown a main frame 10 for an earthworking vehicle, preferably a track-type loader, which frame will be described in relative detail to show the overall loads that may act on the equalizer bar support assembly of the present invention. The main frame 10 includes a rearwardly extending portion 12 and a front or forwardly extending portion 14. Rearward portion 12 includes two parallel extending rails 16 and 18 which are coupled together by a plurality of cross-members 20, 22 and 24. A compartment 26 is formed by these rails and cross-members to house various components of the loader including an engine (not shown). Each of the side rails 16 and 18 has a casing 28 for mounting the final drive of a hydrostatic transmission system which couples engine power to track assemblies (not shown), and a casing 30 having an aperture 32 through which a pivot shaft extends to pivotally mount track roller frames. Rails 16 and 18 at their top surface also carry a mounting 34 which supports the platform of a vehicle operator's cab that can pivot about a pair of ears 35 at the top of frame 10. Also shown are brackets 35a, 35b and 35c near ears 35 for mounting such cab.

The forward portion 14 includes a pair of A-frames 36 and 38 which carry and distribute various loads on the vehicle. A-frame 36 is joined at its upper end to a side plate 40 of rail 16 by a cross-member 42, while A-frame 38 is joined to a similar side plate 44 of rail 18 by a similar cross-member as 42. At their bottom ends, A-frames 36 and 38 are joined to the respective side plates 40 and 44 by a respective transition casting 46. Another cross-member 48 interconnects the upper ends of the A-frames 36 and 38. A pair of ears 50 extend forwardly from cross-member 48, while bosses 52 are welded to each A-frame 36, 38 and side plate 40, 44. Additional bosses such as shown at 54 are aligned on A-frame 36 and the inside of plate 40, and similarly aligned on the A-frame 38 and the inside of side plate 44.

The A-frame 38 has one inclined leg 56 in the shape of a box section formed by a single triangular-shaped plate 58 and two U-shaped members 60 and 62 welded to the plate. Leg 56 includes a transition casting 64 at its lower end. Similarly, A-frame 36 has an inclined leg 66 in the shape of a box section formed by a single triangular-shaped plate 68 and U-shaped members 70 and 72 welded to the plate 68. Another transition casting 74 forms the bottom end of leg 66. A side plate 78 extends between casting 46 and casting 74, as does another side plate (not shown), similarly situated along the side of plate 58.

Figure 2:
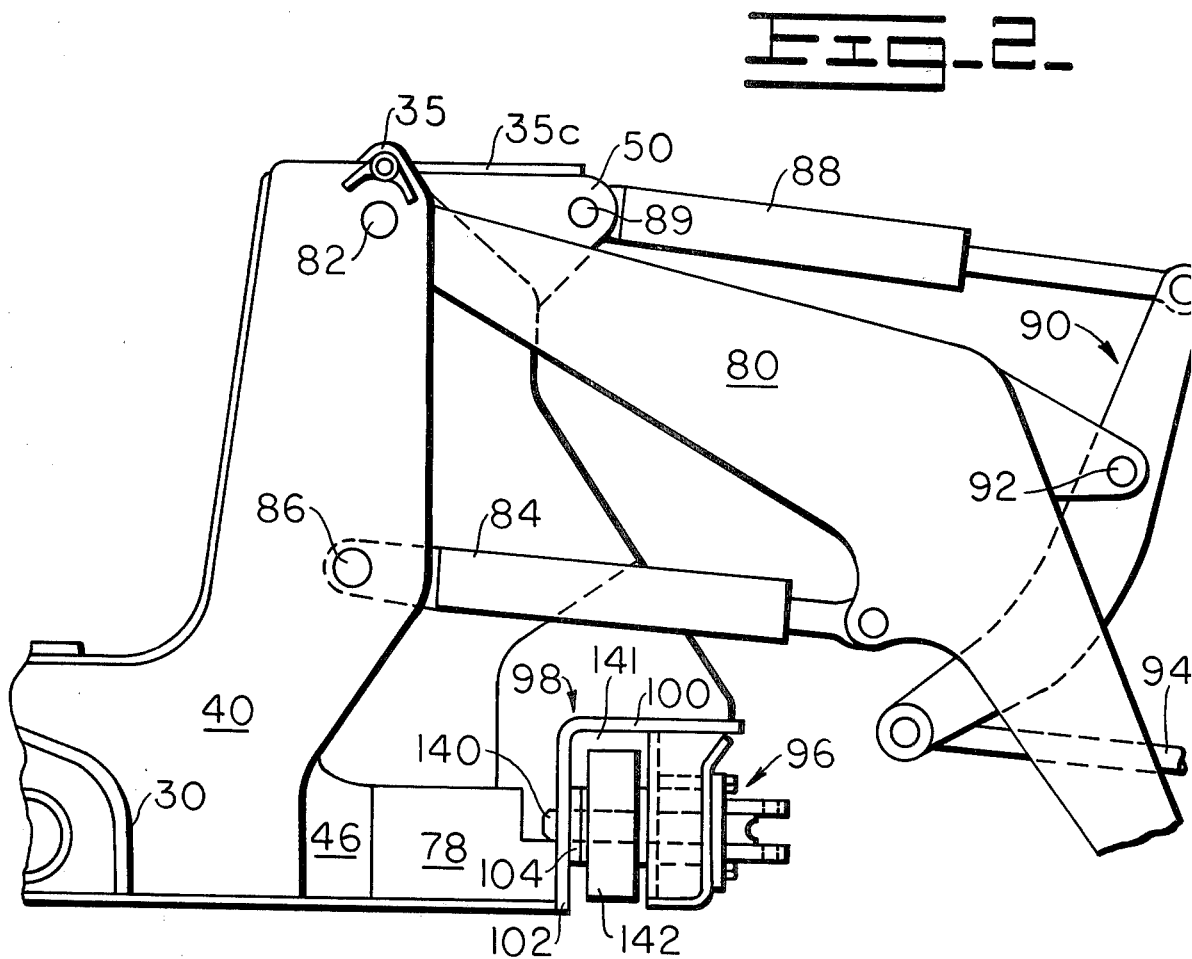
FIG. 2 is a side elevation of the forward portion of the main frame of FIG. 1 showing the attachment of an equalizer bar and members for controlling an implement.
Figure 3:
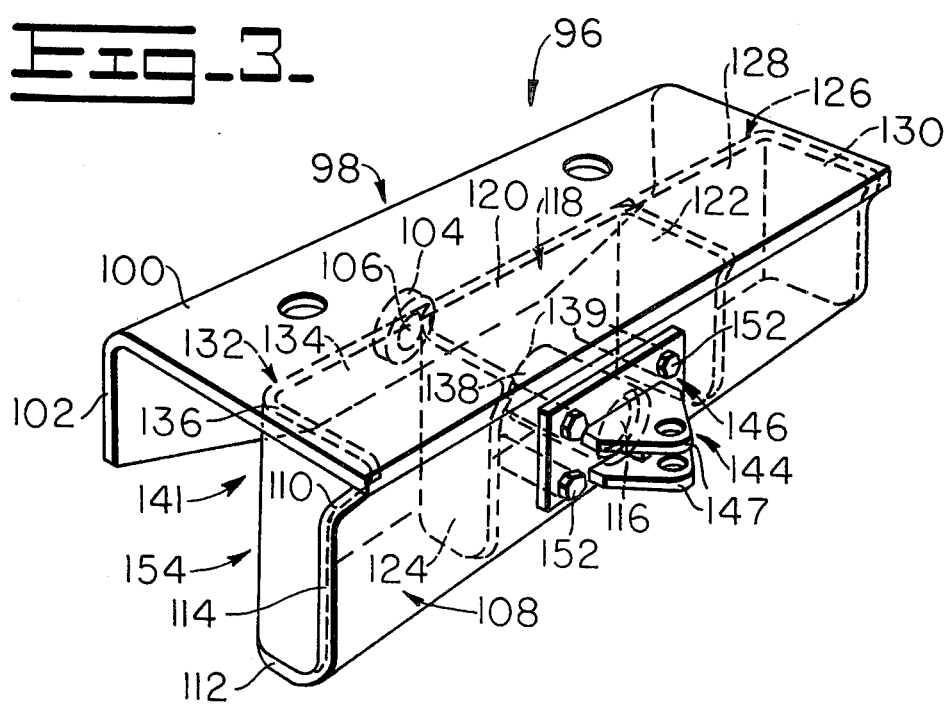
FIG. 3 is a three dimensional view of the support assembly for the equalizer bar and a clevis for pulling a load.

As shown in FIG. 2, a lift arm 80 is pivotally connected at one end to forward portion 14 through a pivot pin 82 which extends through bosses 52 and this one end. Another lift arm (not shown) is similarly coupled to bosses 52 between A-frame 38 and side plate 44. These lift arms have mounted at their other ends an implement (not shown) such as a loader bucket. A lift cylinder 84 is pivotally mounted between A-frame 36 and side plate 40 through a pivot pin 86 which extends through bosses 54 and the cylinder 84. Another lift cylinder (not shown) is similarly mounted between A-frame 38 and side plate 44. A tilt cylinder 88 is pivotally mounted to ears 50 by a pivot pin 89 extending through the ears and the cylinder 88. The rod end of cylinder 88 is coupled to a linkage shown generally at 90 which is pivotally coupled to lift arm 80 by a pivot pin 92. The link 94 of linkage 90 is connected to the loader bucket. As can be appreciated, the actuation of cylinder 84 will cause lift arm 80 to pivot about pin 82 thereby raising (or lowering) the bucket. Actuation of the cylinder 88 will cause linkage 90 to tilt the bucket. The A-frames 36 and 38 will distrubute the loads from lift arm 80 and cylinder 84 down the side legs of the triangular-shaped plates 58 and 68, including legs 56 and 66 specifically described above.

A support assembly 96 for an equalizer bar is shown generally in FIGS. 1 and 2 and in more detail in FIGS. 3-6. The assembly 96 includes an L-shaped plate 98 having a horizontal leg 100 welded to the castings 64 and 74 and a vertically disposed leg 102 welded to these castings and side plates 78. Leg 102 has a welded boss 104 surrounding an aperture 106. An elongated S-shaped plate 108 has an upper inclined leg 110 welded to the lower surface of one end of the leg 100. A lower substantially horizontally extending leg 112 curves into an intermediate substantially vertically extending leg 114 of plate 108. Leg 114 has a hole 116 aligned with hole 106.

A central U-shaped plate 118 has a base 120 which curves into two legs 122 and 124 that are welded to leg 114 at their forward ends. The top and bottom surfaces of plate 118 are welded, respectively, to legs 100 and 112. A side plate 126 of L-shape has a first leg 128 extending substantially parallel to legs 102 and 114 and welded to one side of the base 120. Leg 128 curves into a leg 130 which extends forwardly to be welded at its forward end to leg 114. The top and bottom surfaces of plate 126 are welded to legs 100 and 112, respectively. Another side plate 132 has a leg 134 extending substantially parallel to legs 102 and 114 and welded to the other side of base 120. Leg 134 curves into another leg 136 which extends forwardly to be welded to plate 114. The upper and lower surfaces of plate 132 are welded, respectively, to legs 100 and 112.

An elongated boss 138 is welded to leg 114 about hole 116 and extends through a hole 139 in base 120 aligned with holes 106 and 116. As shown in FIG. 2, a pivot pin 140 extends through bosses 138 and 104 and within a space 141 defined by leg 102 on one side and legs 128, 134 and base 120 on the other side. An equalizer bar 142 can thus be mounted on pivot pin 140 to hold the track roller frames of the loader in lateral alignment.

An attachment 144 for pulling a load can also be added to the equalizer bar support assembly 96. This attachment 144 includes a clevis shown generally at 146 which is mounted on the front surface of leg 114 and has two ears 147 and a stiffener plate 147a therebetween. Four bars 148 are spaced around boss 138 and are welded between leg 114 and base 120. Each bar 148 has a front center tap 150 extending partially therein to receive bolts 152 for mounting the clevis 146 to the leg 114.

The equalizer bar support assembly 96 has a number of significant advantages. By use of the three plates 118, 126 and 132 together with plate 108 and leg 100, a box section is formed, as shown generally at 154 in FIGS. 2 and 6, which provides a high strength support. Also of importance is the fact that with this box section, side plates 126 and 132 can be made thinner than central plate 120, as shown in FIG. 5, while still maintaining the required strength for assembly 96. Also, by the use of single plates such as plate 98 or 132 having legs which curve into each other, welds can be eliminated at this junction of the legs, thereby eliminating a possible failure area due to this welding. Furthermore, the above-described plates of the assembly 96, in addition to acting as structural support members, also provide a cover for the equalizer bar 142 to at least partially protect the bar.

Still further, by means of the bars 148 and their welding to leg 114 and base 120, the assembly 96 is further stiffened to enchance the structural support features of the assembly 96. Advantageously, the pull loads on the clevis 146 are not only carried by the front plate 108, but are transmitted through bars 148 to the central plate 118.

While the invention has been particularly shown and described with reference to a preferred embodiment thereof, it will be understood by those skilled in the art that the foregoing and other changes in form and details may be made therein without departing from the spirit and scope of the invention.

The embodiments of the invention in which an exclusive property or privilege is claimed are defined as follows:

1. A support assembly for an equalizer bar for a loader having a main frame, comprising:
    (a) a plurality of plates being connected in a box section, one of said plates being of a construction to extend from said box section to define a space between said one plate and said box section and to connect said box section to the main frame; and
    (b) means for holding the equalizer bar in said space.

2. A support assembly according to claim 1 further including means for pulling a load, said pulling means including at least one bar connected to opposite plates of said box section.

3. A support assembly according to claim 1 wherein said plates of said box section include:
    (a) a first U-shaped central plate having a base and first and second forwardly extending legs;
    (b) a second L-shaped plate connected to one side of said base and being shaped to form one end of said box section; and
    (c) a third L-shaped plate connected to another side of said base and being shaped to form another end of said box section.

4. A support assembly according to claim 3 wherein said box section includes a fourth plate connected to said first, said second and said third plates and being shaped to form a front side of said box section.

5. A support assembly according to claim 4 further including means for pulling a load, including a plurality of bars connected between said base and said fourth plate, a clevis, and a plurality of means for rigidly connecting said clevis to said fourth plate, said connecting means being constructed to extend through said clevis and into said bars.

6. A support assembly for an equalizer bar, comprising:
    (a) a first central U-shaped plate having a base and first and second legs extending forwardly from said base;
    (b) a second L-shaped plate having a third leg connected to one side of said base and a fourth leg extending forwardly from said third leg;
    (c) a third L-shaped plate having a fifth leg connected to the other side of said base and a sixth leg extending forwardly from said fifth leg;

(d) a fourth plate connected to the front of said first, said second, said fourth and said sixth legs;

(e) a firth L-shaped plate having a seventh leg connected to the top of said first, said second, said third and said fourth plates and extending rearwardly therefrom, and having an eighth leg extending downwardly from said seventh leg and being spaced from said base; and (f) means for holding the equalizer bar in said space between said eighth leg and said base.

7. A support assembly according to claim 6 wherein said base, said fourth plate and said eighth leg have aligned apertures.

8. A support assembly according to claim 6 wherein said first, said second, said third, said fourth and said fifth plates are connected by welds.

9. A support assembly according to claim 6 wherein said second plate and said third plate are thinner than said first plate.

10. A support assembly according to claim 6 wherein said first plate is curved at the intersection of said base with said first and said second legs, and said second, said third, and said fifth plates are curved at the intersection of their respective said legs.

11. A support assembly according to claim 6 wherein said fourth plate is S-shaped having a center leg, a rearwardly extending lower leg connected to the bottom of said first, said second and said third plates, and a forwardly extending upper leg welded to said seventh leg.

12. A support assembly according to claim 1 further including means for connecting loads to said assembly, including:

(a) a clevis;

(b) a plurality of cylindrical bars spaced about said first boss and connected between said base and said fourth plate, and (c) a plurality of bolts respectively extending through said clevis into each said center tap to connect said clevis to said fourth plate.

13. A support assembly according to claim 7, wherein said means for holding includes:

(a) a first boss connected between said apertures of said base and said fourth plate; and (b) a second boss connected about said aperture of said eighth leg.

14. A support assembly according to claim 6 further including means for pulling a load, said pulling means including at least one bar connected to said first plate and said fourth plate.

15. A support assembly according to claim 14, wherein said means for pulling further includes:

(a) a clevis; and (b) means for connecting said clevis to said fourth plate, said connecting means being constructed to extend through said clevis and into said bar.

* * * * *